United States Patent [19]
Hagino

[11] Patent Number: 4,577,611
[45] Date of Patent: Mar. 25, 1986

[54] RECIPROCATING INTERNAL-COMBUSTION ENGINE OF LOW-TEMPERATURE CATALYTIC-COMBUSTION TYPE

[76] Inventor: Shigeo Hagino, No. 953, Oizumigakuenmachi, Nerima-ku, Tokyo, Japan

[21] Appl. No.: 382,944

[22] Filed: May 28, 1982

[30] Foreign Application Priority Data

Jun. 5, 1981 [JP] Japan .................. 56-85679

[51] Int. Cl.⁴ ........................................... F02B 75/08
[52] U.S. Cl. ........................ 123/669; 123/193 P; 123/193 H
[58] Field of Search ........... 123/193 R, 193 H, 193 P, 123/668, 669, 193 B

[56] References Cited

U.S. PATENT DOCUMENTS

| | | | |
|---|---|---|---|
| Re. 30,426 | 11/1980 | Haslett | 123/143 B |
| 2,101,045 | 12/1937 | Blettner | 123/668 |
| 2,926,649 | 1/1960 | Hicks | 123/668 |
| 2,978,360 | 4/1961 | Bradstreet et al. | 123/669 |

FOREIGN PATENT DOCUMENTS

| | | | |
|---|---|---|---|
| 0147036 | 6/1952 | Australia | 123/669 |
| 149915 | 12/1920 | United Kingdom. | |
| 211936 | 2/1924 | United Kingdom. | |
| 445086 | 4/1936 | United Kingdom. | |
| 455329 | 10/1936 | United Kingdom. | |
| 583803 | 12/1946 | United Kingdom. | |
| 690805 | 4/1953 | United Kingdom. | |
| 731889 | 6/1955 | United Kingdom. | |
| 901981 | 7/1962 | United Kingdom. | |
| 1589011 | 5/1981 | United Kingdom. | |

*Primary Examiner*—Craig R. Feinberg
*Attorney, Agent, or Firm*—Blodgett & Blodgett

[57] ABSTRACT

In a reciprocating internal-combustion engine of a low-temperature catalytic-combustion type, catalyst layers which act at low catalyst temperatures of about 500° C. or downwards to permit combustion of a gaseous air-fuel mixture are formed or secured on the inner wall surfaces of each combustion chamber of the engine, whereby low-temperature catalytic combustion of the air-fuel mixture is made possible in quench layer formed along the inner wall surfaces of each combustion chamber separate from its piston-sliding region, whereby incomplete combustion is prevented, a regular operation is made possible even with a dilute gas mixture having air-fuel ratio exceeding the limit of misfire in the conventional engines, the fuel efficiency is enhanced and the reduction in hydrocarbon, CO and NOx in exhaust gas is attained as well.

6 Claims, 7 Drawing Figures

RECIPROCATING INTERNAL-COMBUSTION ENGINE OF LOW-TEMPERATURE CATALYTIC-COMBUSTION TYPE

BACKGROUND OF THE INVENTION

This invention relates to a reciprocating internal-combustion engine of a low-temperature catalytic-combustion type and a combustion method therefor.

Generally speaking:

(A) Control of automotive exhaust emissions that constitute one source of atmospheric pollution is in most cases accomplished in the following ways:

(a) Use of a dilute gaseous mixture in an air-fuel ratio greater than the theoretical value (ca. 14.6 in weight ratio in case where the fuel is gasoline). Usually, the formation of the three pollutants (nitrogen oxides (NOx), unburned hydrocarbon (HC), and carbon monoxide (CO)) in the combustion process decreases as the mixture becomes dilute. Actually, however, a dilute mixture is difficult to ignite in such manner that the regulations on pollutions are cleared and often causes misfire. Efforts to overcome the difficulty have yielded a method of locally supplying an enriched mixture to the point where the electric spark is produced so as to obtain ready ignition and then allow the flame to spread toward the rest of the combustion space occupied by a more dilute mixture. The method makes possible the ignition and combustion of a gaseous mixture dilute as a whole, but it calls for special mechanism and complicated construction and operation, with a consequent increase in cost.

(b) Provision of a catalyst in the exhaust piping for decreases in the NOx, HC, and CO contents in exhaust emissions through oxidation or oxidation and reduction. This increases the flow resistance of exhaust gases in the piping. In addition, the temperature of the catalyst frequently rises above 1000° C., inviting dislocation in the crystal structure of the catalyst, particularly of the carrier with increased activity, causing rapid deterioration, and necessitating early catalyst replacement. For these and other reasons the engine performance is impaired and the operating conditions are restricted. Moreover, where the NOx are to be reduced with HC and CO, a lowered combustion efficiency will result. Thus, the use of a catalyst is costly in every point.

(B) One of the factors most responsible for the pollution of exhaust gases from internal-combustion engines is the incomplete combustion of the air-fuel mixture which is caused in the flame-absent or quench layer.

The term "quench layer" herein used indicates a very thin layer of the gaseous mixture formed adjacent to the combustion chamber surfaces by the cooling action of the engine, i.e., of the surrounding metal walls, and which is discharged out of the chamber before the flame propagates to that layer. This unburned gaseous mixture is partly burned as it is exposed to hot gases on its way to the atmosphere, but most is incompletely burned and diffused into the exhaust gases, rendering its recombustion or recovery difficult.

In the combustion chamber, with the piston at its top dead center (TDC), the quench layer is mainly in contact with the surrounding surfaces of the combustion chamber, formed by the inner walls of the cylinder head, piston head, and cylinder wall, which are separate from the piston-sliding region, and the layer cannot burn. Thus, under normal operating conditions, or while the cylinder is being regularly cooled, this layer is believed to be at temperatures too low for ignition (that is, below 250° C.; particularly, in the range of 200° C. to 250° C. and especially in the initial stages of combustion). Reconsideration of these facts has led to the present invention.

If the wall surfaces mentioned above are utilized as areas on which catalytic combustion takes place, then it will be possible to control the reaction starting temperature and the catalyst temperature within desirable ranges by choosing proper thickness and shape for the catalyst layers. It is no longer essential to find out and employ a catalyst that will stand elevated temperatures (over 1000° C.), and the objects of the invention to be described in detail below can be realized easily and economically, without the need of substantially modifying the construction of existing conventional engines.

SUMMARY OF THE INVENTION

The present invention is aimed at preventing incomplete combustion of the air-fuel mixture in quench layer along the inner wall surfaces, separate from the piston-sliding region (that is, in the non-sliding region), of the combustion chambers in the reciprocating internal-combustion engine, enhancing the combustion efficiency, and burning a dilute gaseous mixture in an air-fuel ratio beyond the critical level of the conventional engines at relatively low temperatures without misfiring, thereby restraining NOx formation in the combustion exhaust gases and decreasing energy consumption.

In realizing the objects, the invention is characterized in that (1) the inner wall surfaces of each combustion chamber have catalyst layers formed or secured thereon and which stably act at low catalyst temperatures of about 500° C. or downwards, especially below 250° C. to permit non-flame combustion of a gaseous air-fuel mixture, whereby low-temperature catalytic combustion of the mixture is made possible in quench layer formed along the inner wall surfaces of each combustion chamber separate from the piston-sliding region thereof, and that (2) the inner wall surfaces of each combustion chamber have catalyst layers formed or secured thereon and which stably act at low catalyst temperatures of about 500° C. or downwards especially below 250° C., an air-fuel mixture is introduced and stirred in quench layer formed on the inner wall surfaces which are separate from the piston-sliding region of the combustion chamber during the operation of the engine, thereby causing catalytic oxidation of the hydrocarbons in the quench layer at low temperatures of 500° C. or under particularly below 250° C. and spreading the heat of reaction into the gaseous mixture of the hydrocarbons and air compressed inside the combustion chamber, whereby the combustion of a gaseous hydrocarbon mixture, rather too dilute to be normally ignited by an electric spark alone, can be started in the low-temperature zone at or below about 500° C., especially below 250° C. without any possibility of misfire.

The invention is embodied as follows. The catalyst layers that stably act at low catalyst temperatures of about 500° C. or downwards especially below 250° C. to permit combustion of the air-fuel mixture may be made of a commercially available metal selected from platinum group metals not required to stand high temperatures (such as above 1000° C.). For example, such catalyst may be obtained by allowing an active γ-alumina of a large specific surface area to support any salt of platinum group metals and then baking or firing the supported salt at or below 900° C. The platinum group metal catalyst layers are formed directly, or preformed and mounted, on the inner wall surfaces of the combustion chamber, which are separate from the piston-sliding region thereof, such as the surfaces of the cylinder wall, cylinder head wall, and piston head wall. The catalyst metal surfaces of the catalyst layers are pebbly, honeycombed, jagged, grainy, or otherwise roughly and unevenly formed. The platinum group metal as the catalyst of the catalyst layers may include platinum sponge obtained, for example, by baking ammonium chloroplatiniate.

Although the present invention uses as the catalyst metal any of platinum group metals supported by γ-alumina, other metals having similar catalytic effects, such as nickel or cobalt, compounds thereof or mixtures thereof, may also be employed.

With the reciprocating internal-combustion engine according to this invention, (1) the fuel combustion efficiency is enhanced and the exhaust gases are made clean with decreased CO and HC contents by precluding incomplete combustion of the air-fuel mixture in the quench layer, (2) the NOx content in the exhaust gases is reduced by burning a dilute gaseous mixture in an air-fuel ratio beyond the critical limit for ordinary internal-combustion engines, at relatively low temperatures without misfiring, and (3) the limits of safe combustion can be expanded to a broader air-fuel ratio range than heretofore.

In this way, the invention eliminates the disadvantages of the conventional internal-combustion engines, viz., the frequent wasteful fuel consumption because of the necessity of using a sufficiently low air-fuel ratio to effect normal combustion without misfiring, and the inevitability of feeding such an excess fuel that invites incomplete combustion, whenever there is a sudden need of large power output as for acceleration. The invention is thus greatly helpful in achieving energy-saving effects.

DETAILED DESCRIPTION OF THE PREFERRED EMBODIMENTS

Figure 1:
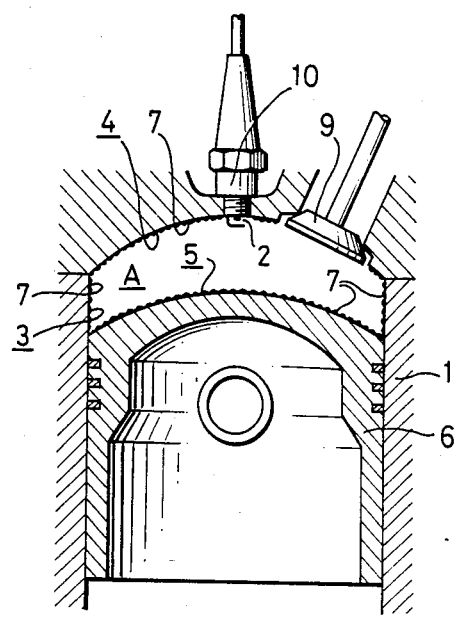
FIG. 1 is a vertical sectional view of an embodiment of the invention as applied to a gasoline-burning internal-combustion engine.
Figure 2:
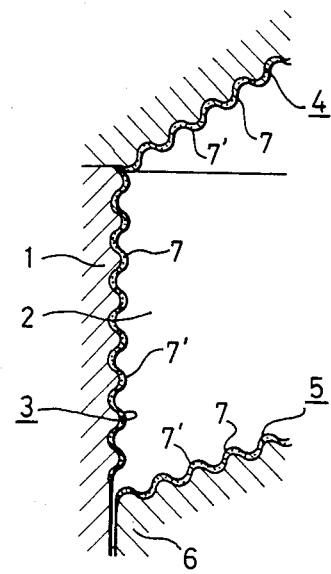
FIG. 2 is an enlarged sectional view of the portion A in FIG. 1.
Figure 3:
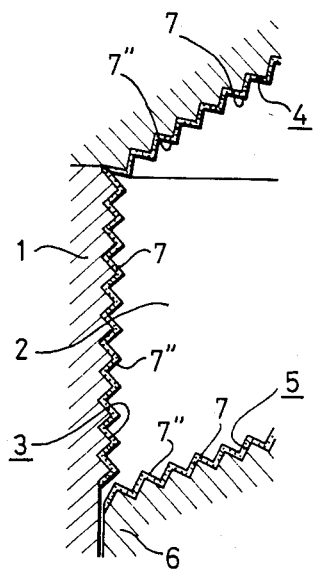
FIGS. 3 to 6 are enlarged sectional views of similar portions of other embodiments.
Figure 4:
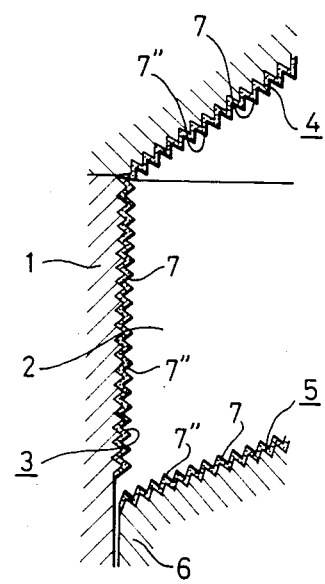
Figure 5:
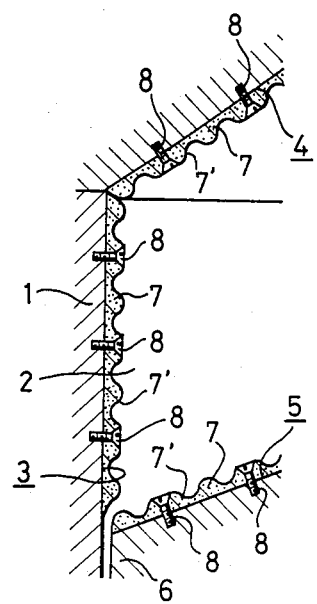
Figure 6:
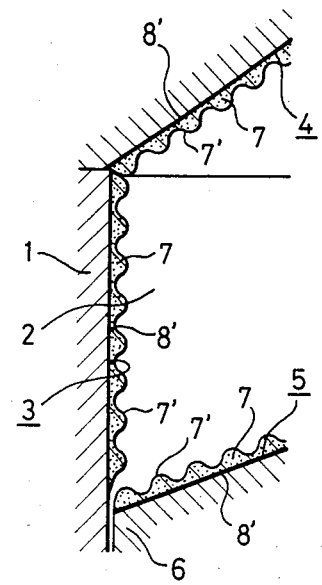

In each of the embodiments of the invention illustrated in the accompanying drawings, catalyst layers 7 capable of stably functioning at or below about 500° C. especially below 250° C. to burn the air-fuel mixture in the quench layer at such low temperature are directly deposited on, or fixedly secured by bolts 8 or with a heat-resistant bonding material 8' to, the surface portions of the walls, viz., the cylinder wall 3, cylinder head wall 4, piston head wall 5, etc., which are separate from the piston-sliding region and which altogether form a combustion chamber 2 of a reciprocating internal-combustion engine 1, such as a gasoline or diesel engine.

Useful as the catalyst layers 7 are either any kind of platinum group metal sponge supported by active γ-alumina and formed into layers with rough, uneven surfaces or any kind of platinum group metal supported by the same carrier and formed into layers with pebbly 7', honeycombed 7'', or jagged 7''' surfaces. $\gamma\text{-}Al_2O_3$ carrier may be replaced by other carriers or even dispensed with in some cases.

Figure 7:
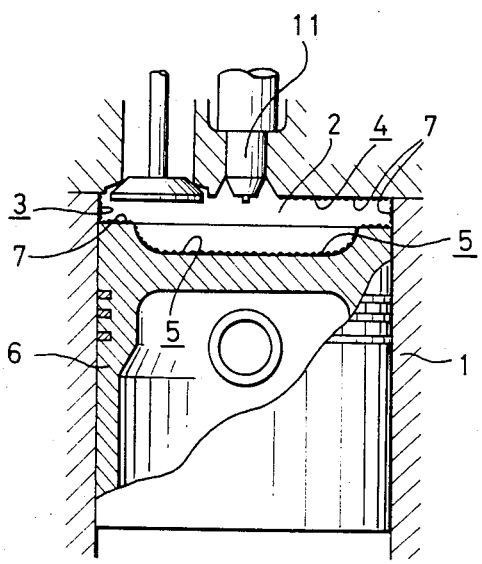
FIG. 7 is a vertical sectional view of another embodiment of the invention as applied to a diesel internal-combustion engine.

While the present invention is shown in FIG. 1 as embodied in a gasoline-burning internal-combustion engine wherein each combustion chamber is equipped with an intake valve 9 and an electric spark plug 10, it is equally applicable to a diesel engine having injection valves 11 as shown in FIG. 7.

According to this invention, as stated above, a catalyst is affixed primarily to the combustion chamber surfaces which are not the piston-sliding region so as to decrease the oxidation activation energy of hydrocarbons in the quench layer and burn the gaseous mixture in this layer at relatively low temperatures (below 500° C. especially below 250° C.), concluding the combustion efficiently before the fuel mixture in the layer is diffused in an incompletely burned state into the exhaust. Furthermore, the gaseous mixture flowing in the zone close to the quench layer is also catalytically burned to spread the resulting heat of oxidation into the hydrocarbon-air mixture under pressure that fills up the engine cylinder. This promotes the combustion of dilute mixture in an air-fuel ratio above the missing range (limits) of conventional engines, particularly the engines that frequently misfire or tend to fail, and permits normal combustion by avoiding such failure at the time of ignition.

The HC, CO, and NOx concentrations in the combustion products of the dilute gaseous mixture decrease markedly. Thus, the elimination by combustion of quench layers combines synergetically with the reduction in overall prcentages of the noxious gases to solve major disadvantages of the prior art arrangements and methods.

In this manner air pollution due to exhaust emissions is averted, the engine output is increased and fuel is saved by burning the fuel in quench layers that have not been combustible in the past, and a long-life engine is provided by keeping the inside of the combustion chamber and the exhaust system clean.

Because of the cooling effect of the inner surfaces of the combustion chamber, the fuel in quench layer originally cannot catch fire (burn) even when the gaseous mixture is exposed to high temperatures (above 2000° C.). The layer is very thin and take the form of an eggshell when the piston is at TDC, and therefore the surface area of the layers relative to the volume is so large that it simply provides a sufficient area of contact with the catalyst. With the piston at TDC, the combustion chamber is defined only by those walls which are separate from the piston-sliding region, and the catalyst can be easily attached to those wall portions in varied ways.

The catalyst employed in the working example of the present invention consisted of powdered platinum black supported by γ-alumina. The catalyst pasted with a binder consisting mainly of an alumina cement and moisture was filled in the recesses of the walls of the piston head and cylinder head which had been drilled to form honeycomb walls. The diameter and depth of the recesses were about 2-3 mm. Thereafter, the cement was cured to obtain catalyst layers securedly held in place.

Modifications of the diameter and depth of those recesses, of course, are accompanied by changes in heat transfer rate, and in this manner the surface temperature of the catalyst can be controlled within a desirable range.

Other possible ways of affixing the catalyst in place include:

(1) Vacuum deposition method

A substrate can be coated with a catalytic substance by using the latter, a metal or oxide, as a heated anode, placing the former on the cathode side, and then applying a DC electric field to the both. More specifically, a catalyst layer having a strong bonding to the substrate is deposited with a high productivity by using a plasma process wherein both anode and cathode are placed in a high frequency current field to produce a plasma condition thereby to ionize the metal atoms and deposit them on the cathode. The catalytic film of an oxide can be solidly secured to the base material, if necessary, by allowing some oxygen to be present in the discharging space of the arrangement. According to the method, the thickness of the resulting deposit or coating can be adjusted to a desired value by controlling the vaporization time and the required energy for vaporization. The catalyst can thus attain a surface temperature necessary and desirable for satisfactory engine performance.

Also, the thickness and porosity of the catalyst layers are controllable by making the surfaces to be deposited, (i.e., the surfaces of the inner walls of the cylinder head and the piston head) pebbly or roughly grainy and by choosing suitable conditions for deposition. In this way, not only the catalyst surface temperature is adjustable but also a large specific catalytic surface area can be obtained.

(2) A carrier supporting a catalytic substance may be formed in advance to a shape adapted to be joined to the inner wall surfaces of the engine cylinder and piston and then securely joined to the latter by bolts or with a heat-resistant bonding material. As for the thickness and surface configurations of the catalyst layers, the aforesaid concepts apply equally to this case.

The operation of the engine is as follows.

When a common gasoline engine is running normally, the wall surface temperatures of the engine cylinders are relatively low, in the range of 200° C.-250° C. Especailly, the lubricated cylinder wall surfaces along which the pistons slide are at about 100° C. (or even lower in the diesel engine). This means that there is no danger of the catalytic action being adversely affected by the wall surface temperatures. Fortunately, under the invention, the surfaces to which the catalyst is attached are the non-lubricated surfaces separate from the piston-sliding region and, because the wall temperatures are ordinarily 200°-250° C., it is not difficult to attach the catalyst so that the catalyst surface temperature may be kept below 1000° C., preferably below 500° C., as already noted. The above relates to the externally cooled reciprocating internal combustion engines. However, in the insulation type diesel engines, too, it is equally desirable to enhance the thermal efficiency while maintaining the temperatures of the inner wall surfaces at or below about 800° C. According to the present invention, the catalyst layers as illustrated in the above-mentioned working embodiment are applicable to such applications without causing any trouble at rather higher reaction velocity. In other words, the catalyst can be easily attached in place to attain the termperature range optimum for the maintenance of the catalytic action for a long period of time, and hence an enhanced catalytic activity can be maintained.

Experiments were conducted in accordance with the invention as below.

The internal-combustion engine tested was a conventional four-cycle gasoline engine with a total displacement of 90 cc mounted on a motorcycle. Prior to the experiments, the engine was modified by narrowing down the diameter of the fuel passages (or the main nozzles) in the carburetor to permit a less than standard amount of fuel to pass.

The modification caused the engine to be fed with such a dilute gaseous mixture that it ran erratically and instably.

After the confirmation of the instable engine performance, comparative experiments were carried out (1) without the catalyst and (2) with the catalyst layers attached to the combustion chamber walls (cylinder head and piston head). The results are summarized in the following table.

The instruments used for the measurements were a CO percentage meter for the CO amount and a Chemiluminescent analyzer, Model 44, made by Thermoelectron Corp. of the U.S. for the NOx amounts.

Following the conclusion of the experiments (that took 200 hours), the engine was disassembled and the combustion chamber surfaces left out of sliding contact with the pistons were inspected. The catalyst layers were found sound and unchanged with no trace of contamination, whereas the wall surfaces free of catalyst layers were black with carbon deposits. This proved that the catalyst layers contributed effectively to the oxidation of the quench layer.

TABLE

| Mode of engine operation | Exhaust emissions | | | | Operating conditions | |
|---|---|---|---|---|---|---|
| | CO (%) | | NOx (ppm) | | | |
| | (1) | (2) | (1) | (2) | (1) | (2) |
| Idling (400 ppm) | 0.4–0.8 | 0–0.3 | 350–450 | 50–250 | Instable run | Very stable run with low noise |
| Acceleration, no-load 400–8000 rpm | 2.5–8.0 | 0.2–1.0 | 350–550 | 50–300 | Frequent misfire during acceleration | Less frequent misfire |
| High-speed cruising no-load (8000 rpm) | 5.5–8.0 | 0.2–0.5 | 400–450 | 100–240 | Stable run with rather sharp conc. changes* | Stable run with relatively moderate conc. changes* |
| Running under load with fully open throttle, braked to keep 1000 rpm | 1.5–2.5 | 0–0.2 | 350–400 | 100–220 | Speed drop and tendency to stall on slightly added braking | Quick recovery of speed on slight release of brake after stall |

*Conc.: read out of the exhaust gas meter.
(1) Engine free of catalyst.
(2) Engine equipped with the catalyst layers according to this invention. The specific surface area of the layers was about 80 m²/gr measured by BET and the ratio of the area occupied by the catalyst layers to the total effective area of the non-sliding wall surfaces was about 45%.

The catalyst layers generally accelerate reaction velocities but cause no irregularities such as knocking due to premature ignition in the case of this experiment.

As can be seen from the table, the beneficial effects of the catalyst are evident and unquestionable.

The experimental data according to the invention compare somewhat unfavorably with the generally published values of the emission-controlled vehicles. This is ascribable to the fact that the test engine was a worn-out one which could hardly attain an adequately high compression ratio and that the contact area of the catalyst on the combustion chamber wall surfaces outside the piston-sliding region was insufficient. If the engine had been tuned up for a normal compression ratio and for an ample catalytic surface area with the catalyst deposited or attached by vacuum deposition or other method, then the exhaust emission data would, no doubt, be further improved.

As has been described above, the present invention renders it possible for engines to achieve favorable effects based on the combustion properties of the gaseous mixture and also the effect of burning the quench layers, and thereby markedly reduce the amounts of noxious pollutants (NOx, HC, and CO) in exhaust gases. The incomplete combustion that occurs in quench layers in particular has been a problem never solvable in conventional ways. The problem has now been solved, for the first time, by the present invention. The invention permits the provision of an anti-pollution, energy-saving internal-combustion engine easily and economically without substantially modifying the construction of the existing engine.

Deposition of incomplete-combustion residues, such as carbon, which often takes place inside conventional internal-combustion engines seldom occurs in the engine according to the invention. The phenomenon is never observed on the catalyst-coated surfaces. This offers a great advantage of precluding any drop of power output or other troubles which would otherwise result from the residue deposition.

What is claimed is:

1. A reciprocating combustion engine powered by an air-fuel mixture and which includes a reciprocal piston and a cylinder defining a combustion chamber, said piston having a head which includes a top surface, said combustion chamber having inner walls with a piston-sliding region and areas separate from the piston-sliding region, along which areas a relatively thin low-temperature quench layer is formed juxtaposed thereto during operation of the engine, characterized by the improvement that:

surfaces of the inner wall of said chamber at the areas separate from the piston-sliding region and including at least the entire top surface of the piston head of said piston are coated with a means for promoting complete combustion of at least the quench layer using a catalyst layer comprising a catalyst carried on a carrier, said catalyst consisting of a powdered metal selected from platinum group metals, which catalyst is adapted to initiate catalytic non-flame combustion of the air fuel mixture in the quench layer formed along said areas which are at a temperature below 250° C. during an initial period of combustion of said mixture and which do not exceed 500° C. during the course operation of the engine.

2. A reciprocating internal combustion engine as recited in claim 1, wherein said catalyst layer is obtained by baking a salt of metal selected from platinum group metals supported by active gamma-alumina of large specific surface area at a temperature not exceeding 900° C., and wherein said platinum metal catalyst layer is formed on those of said inner wall surfaces of said combustion chamber which are separate from the piston-sliding region.

3. A reciprocating internal combustion engine as recited in claim 1, in which said catalyst layer has surfaces which are roughly and unevenly formed.

4. A reciprocating internal combustion engine as recited in claim 1, in which the catalyst is formed from platinum sponge.

5. A reciprocating internal combustion engine as recited in claim 4, wherein said platinum sponge is formed by baking ammonium chloroplatiniate.

6. A reciprocating diesel engine powered by an air fuel mixture, which engine includes a reciprocal piston and a cylinder defining a combustion chamber, said piston having a head which includes a top surface, said chamber having inner walls with a piston-sliding region and areas separate from the piston-sliding region, along which areas a relatively thin, low temperature quench layer is formed juxtaposed thereto during operation of the engine, characterized by the improvement that:

surfaces of the inner walls of said chamber at the areas separate from the piston-sliding region and including at least the entire top surface of the piston head are coated with a means for promoting complete combustion of at least the quench layer using a catalyst layer comprising a catalyst carried on a carrier, said catalyst consisting of a powdered metal selected from platinum group metals, which catalyst is adapted to initiate catalytic non-flame combustion of the air-fuel mixture in the quench layer formed along said areas which are at a temperature below 250° C. during an initial period of combustion of said mixture and which do not exceed 800° C. during the course of operation of the engine.

* * * * *